June 23, 1931. D. J. HAFFORD 1,811,389
LOCKING DEVICE FOR TOOL RETAINERS
Filed June 21, 1929
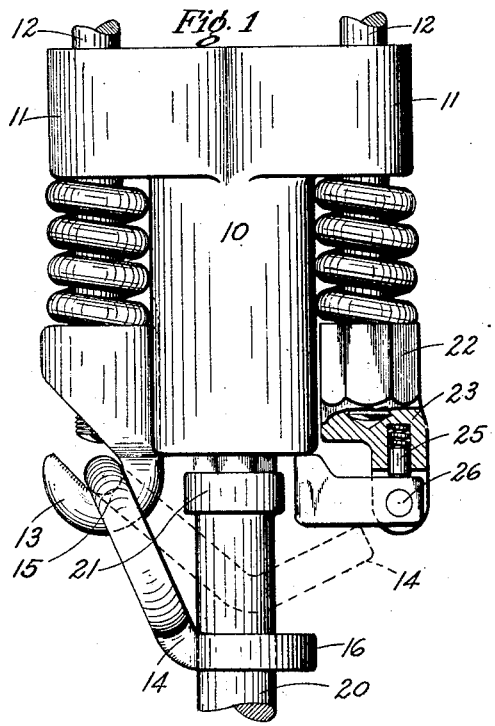
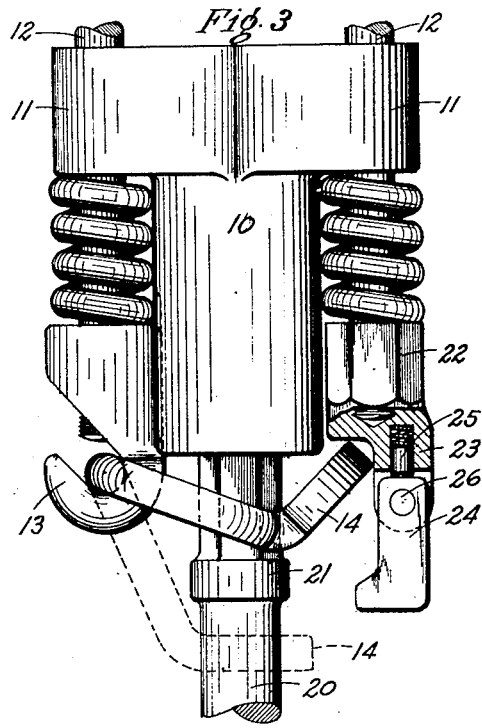
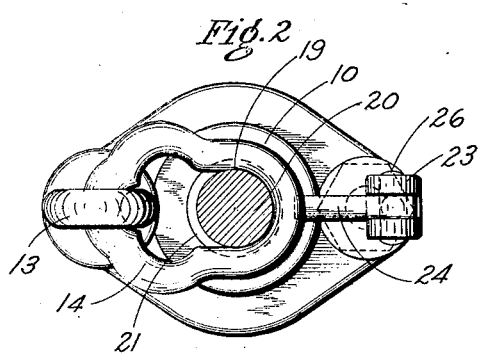
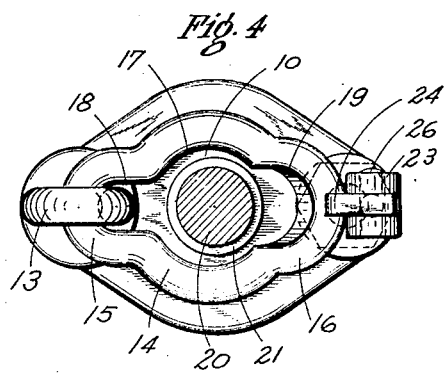
INVENTOR
*DANIEL J. HAFFORD*
BY
ATTORNEY Patented June 23, 1931

1,811,389

UNITED STATES PATENT OFFICE

DANIEL J. HAFFORD, OF CLEVELAND, OHIO, ASSIGNOR TO THE CLEVELAND ROCK DRILL COMPANY, OF CLEVELAND, OHIO, A CORPORATION OF OHIO

LOCKING DEVICE FOR TOOL RETAINERS

Application filed June 21, 1929. Serial No. 372,392.

This invention relates to tool retainers for drills and similar machines, and more specifically to an improved locking mechanism therefor.

One of the objects of this invention is to provide a tool retainer which may be readily opened or closed and which will assure the affixation of the cutting tool within its chuck when the machine is operated in a horizontal plane.

Another object of this invention is to provide a locking device for a tool retainer which can be readily attached to a drill after the machine has been placed in service.

Another object of this invention is to construct a tool retainer locking mechanism which may be readily manipulated and which is sturdy of design and economic of manufacture.

Other objects more or less ancillary to the foregoing and the manner in which all the various objects are realized will appear in the following description which considered in connection with the accompanying drawings sets forth the preferred embodiment of the invention.

In the drawings

Fig. 1 is an elevational view of a fragmentary portion of a fluid operated machine illustrating the tool retainer and the locking mechanism therefor in its operative position;

Fig. 2 is an end elevational view of the head shown in Fig. 1 further illustrating the tool retainer;

Fig. 3 is an elevational view similar to Fig. 1 illustrating the tool retainer and the locking mechanism therefor in its released position;

Fig. 4 is an end elevational view of the drill head shown in Fig. 3 illustrating the form of a tool retainer when it is adjusted to permit the withdrawal of the tool from the machine.

Referring to the drawings the portion of the fluid actuated machine shown herein embodies a head 10 having oppositely disposed ears 11 formed thereon, in which there are loosely mounted side rods 12, the upper portion of these rods being secured in the cylinder of the machine. Upon one of the rods 12 there is a hook 13 which is adapted to support a tool retaining member 14. The tool retainer comprises a unitary link angulated in its lineal plane, the end portions thereof forming the sections 15 and 16. The link is formed with an enlarged central portion leaving an annular opening 17 therein which is interconnected with elongated openings 18 and 19 defined by the walls of the end sections 15 and 16 respectively. The section 16 of the link is formed at a suitable angle with the major portion of the link and with the supporting hook 13 to lie in a plane perpendicular to the cutting tool 20 when the retainer is adjusted in its operative position. As illustrated in Fig. 1, the opening 19 is proportioned with respect to the circumference of the shank of the cutting tool 20 to snugly engage the outer portion of its perimeter when the retainer is adjusted to retain the tool within its chuck.

The tool 20 is constructed with a collar 21, the diameter of which is correlated with the centrally disposed opening 17 in the link to permit the entrance or withdrawal of the tool when the section 15 of the link is adjusted at an obtuse angle with the medial axis of the tool, as illustrated in Fig. 3.

The opposite rod 12 is provided with a nut 22 which is formed with a boss 23 depending therefrom the outer portion of which is bifurcated to support a latch or stop 24. Intermediate the furcations of the boss there is a spring-pressed plunger 25 which is disposed above the latch pivot pin 26 and adapted to bear upon the body of the latch. The free end of the latch 24 is upturned to abut the end portion of the head 10 thus delimiting the vertical movement of the retainer when the latch is horizontally adjusted. The effort exerted by the spring is suitable to maintain the latch in the horizontally disposed position illustrated in Fig. 1 during the operation of the tool notwithstanding the angulated position thereof or the vibration imparted thereto.

In operation the retaining member is normally maintained in the lowered position as illustrated in Fig. 1 wherein the opening 17 engages the body of the cutting tool 20. While in this position the latch is adjusted in horizontally disposed position in order to restrict vertical movement of the retainer beyond a point at which the tool will be encompassed by the end portion 16 of the retainer. When it is desired to remove the tool from the chuck the latch 24 may be adjusted, as shown in Fig. 3, to the position which will permit the retainer to be elevated to abut the head 10 wherein central opening 17 will be aligned with the axis of the tool thus permitting the collar to be withdrawn through the enlarged central portion of the link.

Although one particular embodiment of the invention has been described in detail in the foregoing, it is to be understood that such embodiment has been adopted for the purpose of illustration only. Moreover, it is to be understood that the specific terminology employed herein and the aggroupment of parts, as illustrated, are not intended to be restrictive or confining since many changes in the design will doubtless occur to those skilled in the art without departure from the scope of the appended claims.

I claim:

1. In combination with a tool retainer for a reciprocatively operated tool, a machine head, a tool retainer adjustably supported thereby, and movable stop means interposed between said retainer and machine head.

2. In combination with a tool retainer for a reciprocatively operated tool, a machine head, a tool retainer adjustably supported thereby and a latch adapted to be interposed between the said retainer and machine head.

3. In combination with a tool retainer for a reciprocatively operated tool, a machine head, a tool retainer adjustably supported thereby, and a spring held latch carried by said head and adapted to limit the upward movement of said tool retainer.

4. In combination with a tool retainer for a reciprocatively operated tool, a machine head, a tool supported therein, a tool retainer carried by said head, said retainer comprising a link, the body of which surrounds the said tool, adjusting means for said link and stop means coordinated with said link and interposable between said head and link.

5. In a pneumatic drill, a head, a hook supported thereby, a link movably carried by said hook, a tool supported by said head, a collar on said tool, the walls of said link defining an opening greater than the circumference of the said collar and also an intercommunicating opening congruent with the diameter of the tool, a latch pivotally supported by said head, the body of said latch being arranged to abut the head and intercept the upward movement of the link.

6. In a pneumatic drill, a head, a hook supported thereby, a link movably carried by said hook, a tool supported by said head, a collar on said tool, the walls of said link defining an opening greater than the circumference of the said collar and also an intercommunicating opening congruent with the diameter of the tool, a stop pivotally supported by said head, and disposed relative to the end portion of the head and the zone of movement of the said link to be interposable therebetween.

7. In a pneumatic drill, a head, a hook supported thereby, a link movably carried by said hook, a tool supported by said head, a collar on said tool, the walls of said link defining an opening greater than the circumference of the said collar and also an intercommunicating opening congruent with the diameter of the tool, and means interposable between said link and said head delimiting the upward movement of the link.

In testimony whereof I hereunto affix my signature this 15th day of June, 1929.

DANIEL J. HAFFORD.